United States Patent [19]
Byrd, Jr. et al.

[11] Patent Number: 5,809,496
[45] Date of Patent: Sep. 15, 1998

[54] HYBRID SEARCH

[75] Inventors: Roy Jefferson Byrd, Jr., Ossining, N.Y.; Sebastian Goeser, Stuttgart, Germany

[73] Assignee: International Business Machines Corporation, Armonk, N.Y.

[21] Appl. No.: 802,510

[22] Filed: Feb. 20, 1997

[51] Int. Cl.⁶ ........................................... G06F 17/30
[52] U.S. Cl. ................... 707/5; 707/3; 707/531
[58] Field of Search ................... 707/3, 5, 531

[56] References Cited

U.S. PATENT DOCUMENTS

| | | | |
|---|---|---|---|
| 4,620,295 | 10/1986 | Aiken, Jr. ............................... | 707/531 |
| 5,062,074 | 10/1991 | Kleinberger ........................... | 707/5 |
| 5,299,123 | 3/1994 | Wang et al. ............................ | 707/2 |
| 5,303,361 | 4/1994 | Colwell et al. ........................ | 707/4 |
| 5,404,514 | 4/1995 | Kageneck et al. .................... | 707/5 |
| 5,642,502 | 6/1997 | Driscoll ................................... | 707/5 |
| 5,685,003 | 11/1997 | Peltonen et al. ...................... | 707/531 |
| 5,696,963 | 12/1997 | Ahn ......................................... | 707/5 |
| 5,701,469 | 12/1997 | Brandi et al. .......................... | 707/5 |
| 5,706,365 | 1/1998 | Vijayakumar et al. ............... | 382/230 |
| 5,706,496 | 1/1998 | Naohiko et al. ....................... | 707/5 |
| 5,742,816 | 4/1998 | Barr et al. .............................. | 707/3 |

OTHER PUBLICATIONS

Willett, P., "The ranking of paragraphs as an access mechanism for full text documents", Text Retrievel, pp. 34–45, Nov. 1990.

Radecki, T., "On a probabilistic approach to determining the similarity between Boolean search request formulations", Journal of Documentation, vol. 38, No. 1, p. 14–28, Mar. 1982.

*Primary Examiner*—Thomas G. Black
*Assistant Examiner*—Jean R. Homere
*Attorney, Agent, or Firm*—David J. Kappos

[57] ABSTRACT

A method is described for a computerized search for words in an electronic database with a large number of documents stored in memory. With this method, a Boolean retrieval method is used to determine in which of a large number of documents an initial word meets a Boolean condition. A probabilistic retrieval method is then used to determine in which of the documents fulfilling the Boolean condition, the relevance of appearance of a second word exceeds a specified value. The two retrieval methods use different indexes for this. The disadvantages normally found with this are avoided by the two different indexes having a common element that can be processed by both retrieval methods.

29 Claims, 3 Drawing Sheets

| Word | Document | Location |
|---|---|---|
| B1 | D3 | F131, F132 |
| | D5 | F151 |
| | D6 | F161, F162 |
| B2 | D1 | F211, F212, F213 |
| | D2 | • • • |
| | D3 | F231 |
| | D5 | • • • |
| B3 | D4 | • • • |
| | D5 | • • • |
| | D6 | • • • |
| B4 | D1 | F411 |
| | D5 | F451, F452, F453 |
| B5 | D4 | • • • |
| | D6 | • • • |

| Word | Document | Location |
| --- | --- | --- |
| B1 | D3 | F131, F132 |
|    | D5 | F151 |
|    | D6 | F161, F162 |
| B2 | D1 | F211, F212, F213 |
|    | D2 | . . . |
|    | D3 | F231 |
|    | D5 | . . . |
| B3 | D4 | . . . |
|    | D5 | . . . |
|    | D6 | . . . |
| B4 | D1 | F411 |
|    | D5 | F451, F452, F453 |
| B5 | D4 | . . . |
|    | D6 | . . . |

FIG. 2

"(Japanese Car Manufacturers) NOT Toyota"

Stage 1: Boolean retrieval method

| | | |
|---|---|---|
| B4, Toyota | BF4 | 100010 |
| Not Toyota | BF4X | 011101 |

Stage 2: Probabilistic retrieval method

| | | |
|---|---|---|
| B2, manufacturer | BF2 | 111010 |
| | BF4X | 011101 |
| BF2 AND BF4X | BF42 | 011000 |
| B5  Japanese | BF5 | 000101 |
| | BF4X | 011101 |
| BF5 AND BF4X | BF45 | 000101 |

⋮

BF42 OR BF45 OR  • • •   011101   BFX

*FIG. 3*

HYBRID SEARCH

TECHNICAL FIELD

The invention concerns a method of computerized search for words in an electronic database with a number of stored documents, and more particularly to computerized index and binary searching.

BACKGROUND OF THE INVENTION

Electronic databases are being used increasingly for a wide variety of applications. With these databases, a large number of documents are normally stored in which a user can search for specific words using a computer. With this type of search request, the computer "searches" all the stored documents for the required word and presents documents containing this word to the user as the result.

"Word" is defined as a character or sequence of characters employed in the documents or items forming an electronic database.

Due to processing speed, it is not possible with databases with a large number of stored documents to search all documents sequentially for the required word. For this reason, a so-called index is introduced, which is used to expedite the search process by the computer.

Thus, for example, a so-called two-stage index is known, in which, for each word, all those documents are stored in which the word appears. This two-stage index is normally constructed before the actual search process, so that with a subsequent search by a user, the computer can determine immediately those documents in which the word sought by the user is present. The computer thus no longer searches the documents for the required word, but directly accesses the two-stage index for the result.

There are, moreover, different types of search and hence different search methods, such as a so-called probabilistic retrieval method or Boolean retrieval method.

With known probabilistic retrieval methods, an estimated value is calculated for the relevance of a document with regard to the given search requirement, and those documents are then determined in which the estimated value exceeds a given threshold. Thus, for example, all documents can be determined in which the estimated relevance for the existence of the word "Japanese car manufacturer" is greater than a given value.

With known Boolean retrieval methods, those documents that fulfil a predictable Boolean condition are determined directly. For example, all documents that do not contain the word "Toyota" can be determined.

For this type of retrieval method, it is known that the indexing method mentioned is used in order to achieve a more effective retrieval overall. The indexing methods for Boolean and probabilistic retrieval methods are different for this.

It is possible to carry out the above retrieval methods one after the other. This means that from documents in which, using the probabilistic method to search for the existence of, for example, the words "Japanese car manufacturer", a given probability is exceeded, all those documents containing the word "Toyota" can be excluded. This is achieved by applying the Boolean condition "NOT Toyota" to the documents determined by the probabilistic retrieval method.

It is known that indexing is in any event required for probabilistic retrieval methods. However, assuming that the number of documents determined by the probabilistic method is quite low, no special indexing is required for the subsequent Boolean retrieval method. Thus only one indexing process is needed to carry out a probabilistic retrieval method with subsequent Boolean retrieval method.

It is likewise theoretically possible to carry out the aforesaid retrieval methods in reverse order.

In this case the probabilistic retrieval method would be carried out on the basis of documents fulfilling the Boolean condition. This would mean, for example, that all those documents containing the word "Toyota" would first be masked out of all of them. On this basis, the probabilistic retrieval method would then determine those documents in which a given value is exceeded for the appearance of, for example, the words "Japanese car manufacturer".

The advantage of this method is that the probabilistic retrieval method is applied on the basis that documents containing the word "Toyota" are no longer taken into account. The result of the retrieval thus reveals a larger number of relevant documents than with the reverse process, in which those documents containing the word "Toyota" are excluded by the Boolean retrieval method from the relevant documents after the event.

As, with the procedure just described—first Boolean then probabilistic retrieval method—the Boolean retrieval method is applied to all documents, indexing is then needed. As stated, the subsequent probabilistic retrieval method then requires an index. Thus, with the present sequence of retrieval methods described, two indexes are required in total. This is a disadvantage in particular for carrying out the complete search and in terms of the processing time required for this. For this reason, no method is known to date of effectively combining a Boolean retrieval method with subsequent probabilistic retrieval method.

SUMMARY OF THE INVENTION

The invention is designed to create a method for a computerized search for words in an electronic database with a number of stored words, enabling an effective sequence of Boolean and then probabilistic retrieval methods.

With a method as described initially, the task is resolved with the invention by the two retrieval methods using different indexes, but with a common part that can be processed by both retrieval methods.

This means that the different indexes of the two retrieval methods are interlinked. The probabilistic retrieval method can thus continue to use the Boolean retrieval method as a basic principle and build on this. As a result of this, the entire sequence of the two retrieval methods one after the other is accelerated. The entire search is thus simplified and hence more effective overall.

In a further development of the invention, a sequence of bits is created by the Boolean retrieval method, in which each bit represents a document, and the value of a given bit indicates whether the Boolean condition is met or not, and the sequence of bits is then used to calculate by the probabilistic retrieval method the relevance of appearance of the second word only in those documents which fulfil the Boolean condition.

The sequence of bits represents a component that can be processed by both retrieval methods. With the help of this sequence of bits, the Boolean and probabilistic retrieval methods can be linked. The sequence of bits is created by the Boolean retrieval method and then processed further by the probabilistic retrieval method.

Advantageous versions of the invention include using a two-stage index in the Boolean retrieval method, which indicates for each word which of the numerous documents contains the word or not, and also a three-stage index in the probabilistic retrieval method which indicates for each word which of the numerous documents contains the word, and the location of the word in the document concerned. A particular advantage can be obtained if the bit sequence derives from the two-stage index and is applied to the three-stage index. In particular, the bit sequence derived from the two-stage index is linked to the documents of the three-stage index by means of an AND operation.

Further advantageous further developments and versions of the invention can be seen from the following description and drawing of an example of a version of the invention. In this, the features explained represent those of the invention irrespective of the summary in the claims and the associated references.

For a fuller understanding of the present invention, reference should be made to the following detailed description taken in conjunction with the accompanying drawings.

BRIEF DESCRIPTION OF THE DRAWINGS

FIG. 2 shows a table for a three-stage index of a retrieval method for computerized search of words in an electronic database; and FIG. 3 shows a schematic arrangement of steps in an example of a version of a method as per the invention.

DETAILED DESCRIPTION OF THE INVENTION

Figure 1:
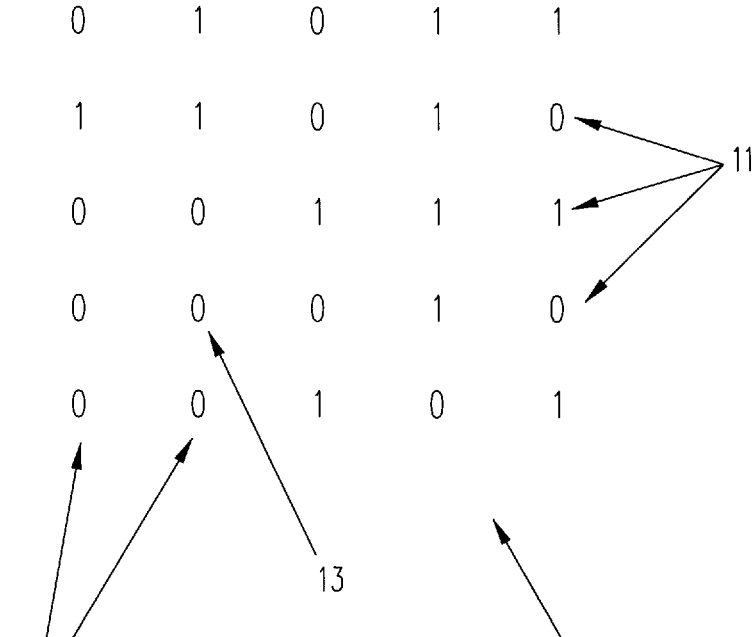
FIG. 1 shows a table for a two-stage index of a retrieval method for computerized search of words in an electronic database.

FIG. 1 shows a table 10 for a two-stage index, and this serves as a basis for illustrating a Boolean retrieval method for computerized search of words in an electronic database as described in the following.

Table 10 shows a number of words B1, B2, B3, etc. and a number of documents D1, D2, D3, etc. A line 11 is assigned to each of the words B1, B2, B3, etc. and a column 12 is assigned to each of the documents D1, D2, D3, etc. At the intersections 13 of the lines 11 and the columns 12 there is an entry of either "0" or "1". The "0" signifies that the word is not present in the document and the "1" that it is present in the document. This assigns the words B1, B2, B3 etc. to the documents D1, D2, D3 etc. such that, for example, according to the table the word B4 is present in documents D1 and D5 and is not in documents D2, D3, D4 and D6.

With the Boolean retrieval method, the Boolean condition "NOT" is for example applied to the word to be retrieved. Thus for example, with the Boolean retrieval method, the word "NOT Toyota" means that all those documents should be specified which do not contain the word "Toyota". This search can be carried out using the table 10 and the two-stage index contained therein, with all the lines belonging to the word "Toyota" specifying all those documents which are assigned a "0", i.e. which do not contain the word "Toyota".

If, for example, B4 represents the word "Toyota", "NOT Toyota" is fulfilled by documents D2, D3, D4 and D6.

FIG. 2 shows a table 20 for a three-stage index, and this serves as a basis below for illustrating a probabilistic retrieval method for computerized search of words in an electronic data base.

Table 20 shows a number of words B1, B2, B3, etc. and a number of documents D1, D2, D3, etc. A number of lines 21 is assigned to each of the words B1, B2, B3, etc., corresponding to the number of documents D1, D2, D3, etc. One or more locations Fxyz is specified for each of the documents D1, D2, D3, etc.—where such exists—assigned to a given word, where the word occurs in the document. Here x is the word index, y the document index and z a sequential index of the relevant location. Thus, for example, F452 is the second location for the word B4 in document D5. If no location is specified, the word is not present in the document.

In comparison with the two-stage index as per table 10, from which the documents in which a specified word is present can be determined, with the three-stage index as per table 20, the locations at which the word appears in the document can also be determined.

This information on the location of a word in a document is used by the probabilistic retrieval method to calculate an estimated value for the relevance of the document with regard to the word based on specified rules. If, for example, all the information on "Japanese car manufacturers" is compiled by the probabilistic retrieval method, the specified rules are applied to the documents belonging to the individual words and the locations specified for these.

This rule can, for example, mean that when the word B2 corresponds to "Manufacturer", for example, the given number of three locations means that document D1 is a document in which not only does the word "Manufacturer" happen to appear but also concerns manufacturers or suchlike. Based on this rule, document D1 then has more relevance in containing information on "Japanese car manufacturers" than for example document D3, in which the word "Manufacturer" has only one location. In this way, by the probabilistic retrieval method a decision is not only made for each word whether it appears in a document or not, but also specifies what relevance the document has in relation to the word. This can then be extended by means of special rules to linking several words, for example for the word sequence "Japanese car manufacturer".

If a user then wants to obtain all the information from an electronic database contained under "Japanese car manufacturer", but does not want any information on "Toyota" in this, this search proceeds as follows: "(Japanese car manufacturer) NOT Toyota". This is a hybrid search comprising a Boolean and a probabilistic retrieval method.

As explained at the outset, it is advantageous with this type of search to use the Boolean retrieval method first and then the probabilistic retrieval method. This means that firstly with the Boolean retrieval method all documents are excluded which contain the word "Toyota", and then with the probabilistic retrieval method, all documents containing "Japanese car manufacturers" are retrieved.

FIG. 3 shows steps in a method for computerized search for words in an electronic database with which this search can be carried out. As an example, the search can be specified for all information under "(Japanese car manufacturers) NOT Toyota", processed in the 1st stage by the Boolean retrieval method and in the 2nd stage by the probabilistic retrieval method.

A large number of documents are stored in the database. Table 10 in FIG. 1 and table 20 in FIG. 2 are also stored in the computer memory. For example, the word B2 corresponds with the word "Manufacturer", word B4 with the word "Toyota" and word B5 with the word "Japanese".

According to FIG. 3, in stage 1, the Boolean retrieval method selects all those documents via the two-stage index in FIG. 1 which meet the Boolean condition "NOT Toyota".

This is achieved by the binary "0" and "1" elements contained in the word "Toyota", i.e. in the lines pertaining to word B4, being interpreted as bit sequence BF4 and read off the table 10. This bit sequence BF4 is thereafter inverted to bit sequence BF4X due to the Boolean "NOT" condition.

In stage 2 in FIG. 3, the bit sequence BF4X is then used by the probabilistic retrieval method. The specified bit sequence thus represents an element that can be processed by both the Boolean and the probabilistic retrieval method, although the two retrieval methods use different indexes.

According to FIG. 3, in stage 2, the probabilistic retrieval method first takes the word B2 "Manufacturer" and reads the corresponding bit sequence BF2 off the table 10. The bit sequence BF2 is then linked with bit sequence BF4X in the form of an AND operation.

In the example under consideration, the result is that of documents D1, D2, D3 and D5 which contain the word B2, those documents containing Toyota are excluded, i.e. documents D1 and D5. The result is thus documents D2 and D3.

This procedure is equivalent to an AND operation with bit sequence BF4X with the documents D1, D2, D3 and D5 contained in table 20 for word B2. As stated, this AND operation gives documents D2 and D3 as a result.

The result of the AND operation is again a bit sequence referenced BF42 in FIG. 3.

Similarly, for the word B5 "Japanese", a sequence BF5 is calculated whose AND operation with BF4X gives the bit sequence BF45, and so on for all the other words in the search request.

The bit sequences BF42, BF45, etc. obtained in this way are combined by an OR operation into bit sequence BFX. According to table 10, this bit sequence BFX corresponds to documents D2, D3, D4 and D6.

The probabilistic retrieval method is now applied to this bit sequence BFX. This means that for each of the named documents D2, D3, D4 and D6 and for each word B4, B2, an estimated value is calculated for the relevance of the document with regard to the word. This calculation does not therefore include any information from documents D1 and D5 excluded in the Boolean retrieval method.

In all, the probabilistic retrieval method is thus only used in conjunction with those documents which meet the Boolean condition NOT Toyota. This is achieved by the bit sequence obtained by the Boolean retrieval method, BF4X in the example here, being linked firstly with those bit sequences or those documents which belong to the words to be retrieved by the probabilistic retrieval method, BF2 and BF5 in the example in question and/or the corresponding words B2 and B5 of the associated documents in table 20.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for searching an electronic database in which a number of documents are stored, said method comprising the steps of:

conducting a Boolean retrieval search of an initial word using a first index of said electronic database to determine in which of said number of documents said initial word meets a Boolean condition;

conducting a probabilistic retrieval search of a second word using a second index of said electronic database to determine in which of said documents meeting said Boolean condition, the relevance of appearance of said second word exceeds a specified value; and wherein said first and second indexes have a common element that can be processed by both said Boolean and said probabilistic retrieval searches.

2. The method of claim 1, wherein:

said step of conducting a Boolean retrieval search additionally comprises the step of creating a bit sequence in which each bit represents one of said number of documents and the value of said each bit specifies whether said Boolean condition is met or not; and said step of conducting said probabilistic retrieval search comprises computing said relevance of appearance of said second word only for those documents specified by said bit sequence as meeting said Boolean condition.

3. The method of claim 2, wherein:

said step of conducting a Boolean retrieval search comprises using a two-stage said first index, which index specifies for a selected word, which of said number of documents contain said word or not.

4. The method of claim 1, wherein:

said step of conducting a Boolean retrieval search comprises using a two-stage said first index, which index specifies for a selected word, which of said number of documents contain said word or not.

5. The method of claim 4, wherein:

said step of conducting a probabilistic retrieval search comprises using a three-stage said second index, which index specifies for a selected word, which of said number of documents contain said word, and at which location said word is found in each said documents containing said word.

6. The method of claim 1, wherein:

said step of conducting a probabilistic retrieval search comprises using a three-stage said second index, which index specifies for a selected word, which of said number of documents contain said word, and at which location said word is found in each said documents containing said word.

7. The method of claim 2, wherein:

said step of conducting a probabilistic retrieval search comprises using a three-stage said second index, which index specifies for a selected word, which of said number of documents contain said word, and at which location said word is found in each said documents containing said word.

8. The method of claim 3, wherein:

said step of conducting a probabilistic retrieval search comprises using a three-stage said second index, which index specifies for a selected word, which of said number of documents contain said word, and at which location said word is found in each said documents containing said word.

9. The method of claim 8, wherein:

said created bit sequence is derived from said two-stage index and is applied to said three-stage index.

10. The method of claim 9, wherein:

said step of conducting a probabilistic retrieval search comprises linking said created bit sequence with said documents of said three-stage index by means of an AND operation.

11. A computer system for searching an electronic database in memory in which a number of documents are stored, comprising:

first and second indexes of said electronic database, said indexes having a common element;

a Boolean retrieval searcher for conducting a Boolean retrieval search of an initial word using said first index to determine in which of said number of documents said initial word meets a Boolean condition; and a probabilistic retrieval searcher for conducting a probabilistic retrieval search of a second word using said second index and said common element thereof to determine in which of said documents meeting said Boolean condition, the relevance of said second word exceeds a specified value.

12. The computer system of claim 11, wherein:

said Boolean retrieval searcher additionally provides a bit sequence in which each bit represents one of said number of documents and the value of said each bit specifies whether said Boolean condition is met or not; and said probabilistic retrieval searcher computes said relevance of appearance of said second word only for those documents specified by said bit sequence as meeting said Boolean condition.

13. The computer system of claim 12, wherein:

said first index comprises a two-stage index which specifies for a selected word, which of said number of documents contain said word or not.

14. The computer system of claim 11, wherein:

said first index comprises a two-stage index which specifies for a selected word, which of said number of documents contain said word or not.

15. The computer system of claim 14, wherein:

said second index comprises a three-stage index which specifies for a selected word, which of said number of documents contain said word, and at which location said word is found in each said documents containing said word.

16. The computer system of claim 11, wherein:

said second index comprises a three-stage index which specifies for a selected word, which of said number of documents contain said word, and at which location said word is found in each said documents containing said word.

17. The computer system of claim 13, wherein:

said second index comprises a three-stage index which specifies for a selected word, which of said number of documents contain said word, and at which location said word is found in each said documents containing said word;

said Boolean retrieval searcher provides said bit sequence from said two-stage index; and said probabilistic retrieval searcher computes said relevance using said bit sequence and said three-part index.

18. The computer system of claim 17, wherein:

said probabilistic retrieval searcher additionally comprises an AND computation arrangement for linking said provided bit sequence with said three-stage index.

19. An article of manufacture for use in a computer system for searching an electronic database in which a number of documents are stored, said article of manufacture comprising a computer-readable storage medium having a computer program embodied in said medium which may cause the computer system to:

conduct a Boolean retrieval search of an initial word using a first index of said electronic database to determine in which of said number of documents said initial word meets a Boolean condition;

conduct a probabilistic retrieval search of a second word using a second index of said electronic database to determine in which of said documents meeting said Boolean condition, the relevance of appearance of said second word exceeds a specified value; and wherein said first and second indexes have a common element that can be processed by both said Boolean and said probabilistic retrieval searches.

20. The article of manufacture of claim 19, wherein said computer program embodied in said medium additionally may cause the computer system to:

conduct said Boolean retrieval search by additionally creating a bit sequence in which each bit represents one of said number of documents and the value of said each bit specifies whether said Boolean condition is met or not; and conduct said probabilistic retrieval search by computing said relevance of appearance of said second word only for those documents specified by said bit sequence as meeting said Boolean condition.

21. The article of manufacture of claim 20, wherein said computer program embodied in said medium additionally may cause the computer system to:

conduct said Boolean retrieval search using a two-stage said first index, which index specifies for a selected word, which of said number of documents contain said word or not.

22. The article of manufacture of claim 19, wherein said computer program embodied in said medium additionally may cause the computer system to:

conduct said Boolean retrieval search using a two-stage said first index, which index specifies for a selected word, which of said number of documents contain said word or not.

23. The article of manufacture of claim 22, wherein said computer program embodied in said medium additionally may cause the computer system to:

conducting said probabilistic retrieval search using a three-stage said second index, which index specifies for a selected word, which of said number of documents contain said word, and at which location said word is found in each said documents containing said word.

24. The article of manufacture of claim 19, wherein said computer program embodied in said medium additionally may cause the computer system to:

conduct said probabilistic retrieval search using a three-stage said second index, which index specifies for a selected word, which of said number of documents contain said word, and at which location said word is found in each said documents containing said word.

25. The article of manufacture of claim 20, wherein said computer program embodied in said medium additionally may cause the computer system to:

conducting said probabilistic retrieval search using a three-stage said second index, which index specifies for a selected word, which of said number of documents contain said word, and at which location said word is found in each said documents containing said word.

26. The article of manufacture of claim 21, wherein said computer program embodied in said medium additionally may cause the computer system to:

conduct said probabilistic retrieval search using a three-stage said second index, which index specifies for a selected word, which of said number of documents contain said word, and at which location said word is found in each said documents containing said word.

27. The article of manufacture of claim 26, wherein: said created bit sequence is derived from said two-stage index and is applied to said three-stage index.

28. A computer program product for operating a computer system for searching an electronic database in which a number of documents are stored, said computer program product comprising a storage medium having computer-readable program code embodied in said medium for causing the computer system to:

conduct a Boolean retrieval search of an initial word using a first index of said electronic database to determine in which of said number of documents said initial word meets a Boolean condition;

conduct a probabilistic retrieval search of a second word using a second index of said electronic database to determine in which of said documents meeting said Boolean condition, the relevance of appearance of said second word exceeds a specified value; and wherein said first and second indexes have a common element that can be processed by both said Boolean and said probabilistic retrieval searches.

29. The computer program product of claim 28, wherein said computer-readable program code additionally causes the computer system to:

conduct said Boolean retrieval search by additionally creating a bit sequence in which each bit represents one of said number of documents and the value of said each bit specifies whether said Boolean condition is met or not; and conduct said probabilistic retrieval search by computing said relevance of appearance of said second word only for those documents specified by said bit sequence as meeting said Boolean condition.

* * * * *